United States Patent [19]

Tomiya et al.

[11] 4,014,561
[45] Mar. 29, 1977

[54] SUSPENSION MECHANISM FOR FOUR-WHEELED VEHICLE

[75] Inventors: Ryuichi Tomiya; Koji Kaki, both of Sagamihara; Yoshitomo Tezuka, Hachioji, all of Japan

[73] Assignee: Aida Engineering Kabushiki Kaisha, Sagamihara, Japan

[22] Filed: Mar. 12, 1976

[21] Appl. No.: 666,379

[30] Foreign Application Priority Data

June 27, 1975 Japan .................... 50-90076

[52] U.S. Cl. .................... 280/104; 280/723
[51] Int. Cl.² .................... B60B 19/02
[58] Field of Search .......... 280/723, 721, 722, 717, 280/104, 112, 112 A

[56] References Cited

UNITED STATES PATENTS

| | | | |
|---|---|---|---|
| 2,083,381 | 6/1937 | Hutchison | 280/723 |
| 2,099,819 | 11/1937 | Mercier | 280/722 |
| 2,251,698 | 8/1941 | Wilson | 280/721 |
| 3,147,990 | 9/1964 | Wettstein | 280/723 |
| 3,154,317 | 10/1964 | Gustafsson | 280/104 |

FOREIGN PATENTS OR APPLICATIONS 837,667  11/1938  France .................... 280/721

*Primary Examiner*—Richard J. Johnson
*Attorney, Agent, or Firm*—Ladas, Parry, Von Gehr, Goldsmith & Deschamps

[57] ABSTRACT

A suspension mechanism for a four-wheeled automotive vehicle body with independently suspended wheels, comprises front and rear pairs of transversely aligned horizontal torsion bars rotatably supported by front and rear parts of the body. The transversely outer ends of these torsion bars are indirectly coupled to the respective wheels, so that these torsion bars undergo torsional displacement when their associated wheels are moved up and down. The transversely inner ends of the front and rear torsion bars are rigidly coupled to front and rear vertical arms the free ends of which are mutually connected by links extending in the front-to-rear direction of the body. One of the front and rear pairs of vertical arms are pivotally connected by a transverse lever pivotally supported at its middle parts by the vehicle body, whereby the diagonally opposite wheels move in the same vertical direction while the transversely opposite wheels move in the opposite vertical directions.

6 Claims, 7 Drawing Figures

SUSPENSION MECHANISM FOR FOUR-WHEELED VEHICLE

BACKGROUND OF THE INVENTION

This invention relates to suspension mechanisms for four-wheeled vehicles and more particularly to a suspension mechanism for four-wheeled automative vehicles of the type wherein the vehicle wheels are suspended independently.

Heretofore, various vehicle suspension systems have been proposed for improving shock absorbing characteristics of vehicles and for reducing rolling and pitching of vehicles which occur as they are driven on rough roads. These vehicle suspension systems, however, are complicated in construction and hence expensive.

SUMMARY OF THE INVENTION

It is therefore the main object of this invention to provide a suspension mechanism for four-wheeled vehicles which is relatively simple in construction and which can substantially reduce rolling and pitching of vehicles, thereby improving the riding comfort thereof.

Another object of this invention is to provide a suspension mechanism for four-wheeled vehicles which does not affect the provision of doorways on both sides of the vehicle body, and which does not narrow the trunk and the engine compartment of the vehicles.

According to this invention, these objects are attained by a suspension mechanism for a four-wheeled vehicle body, comprising a pair of horizontal front torsion bars rotatably supported by a front part of the vehicle body and aligned in a direction transverse to the front-to-rear direction of the vehicle body, a pair of front arms extending forwardly of the vehicle body and secured to the transversely outer ends of the front torsion bars, respectively, said front arms carrying front vehicle wheels, respectively, a pair of front vertical arms having their upper ends secured to the transversely inner ends of the front torsion bars, respectively, a pair of horizontal rear torsion bars rotatably supported by a rear part of the vehicle body and aligned in a direction transverse to the front-to-rear direction of the vehicle body, a pair of rear arms extending rearwardly of the vehicle body and secured to the transversely outer ends of the rear torsion bars, respectively, said rear arms carrying rear vehicle wheels, respectively, a pair of rear vertical arms having their upper ends secured to the transversely inner ends of the rear torsion bars, respectively, a pair of links extending in said front-to-rear direction and haivng their front ends pivotally connected to the lower ends of said front vertical arms and their rear ends pivotally connected to the lower ends of said rear vertical arms, respectively, and a transversely extending lever pivotally supported at its middle part by the vehicle body and pivotally connected at its both ends to intermediate parts of one of said pairs of the front and rear vertical arms.

The invention will be better understood from the following detailed description of the invention with respect to a preferred embodiment thereof when read in conjunction with the accompanying drawings, wherein like parts are designated by like reference numerals.

DETAILED DESCRIPTION OF THE INVENTION

Figure 1:
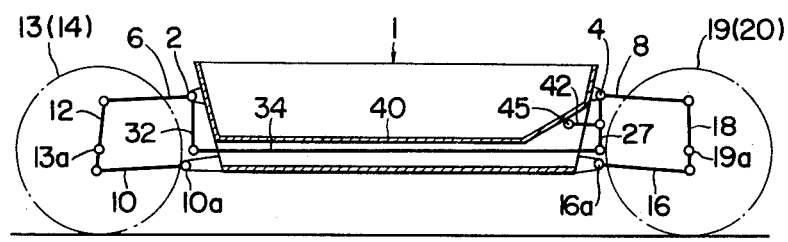
FIG. 1 is a vertical longitudinal section, schematically showing an automotive vehicle provided with the suspension mechanism according to this invention.
Figure 2:
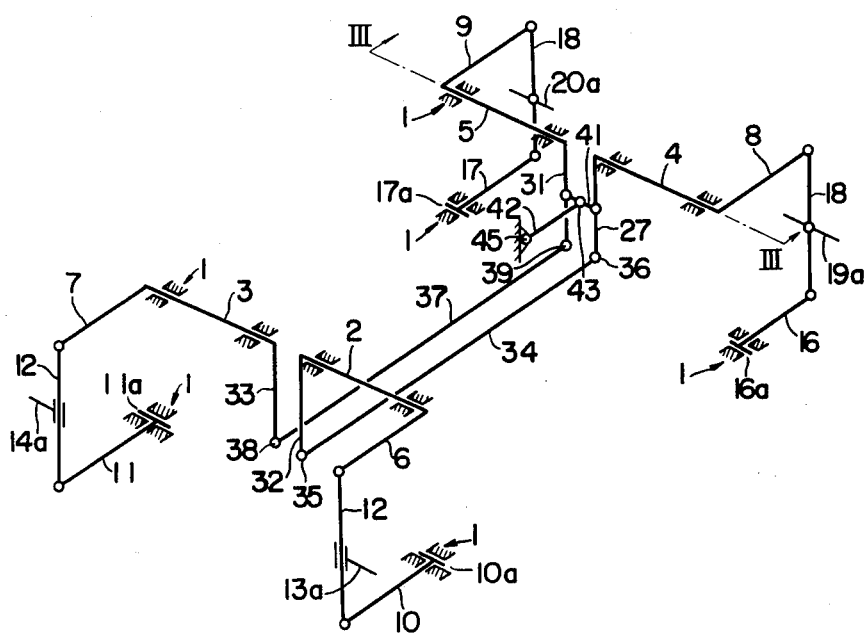
FIG. 2 is a schematic perspective view showing the suspension mechanism according to this invention.

Referring now to FIGS. 1 and 2, there is indicated schematically an example of a vehicle body suspension mechanism according to this invention, which comprises front torsion bars 2 and 3 and rear torsion bars 4 and 5, all extending transversely relative to the longitudinal center line of a vehicle body 1. Forwardly extending generally horizontal front upper arms 6 and 7, which slightly diverge forwardly, are at their rear or proximal ends rigidly connected to the transversely outer ends of the front torsion bars 2 and 3, respectively, and rearwardly extending generally horizontal rear upper arms 8 and 9, which slightly diverge rearwardly, are at their forward or proximal ends rigidly connected to the transversely outer ends of the rear torsion bars 4 and 5, respectively.

Below the front upper arms 6 and 7, there are provided forwardly extending front lower arms 10 and 11. The rear or proximal ends of the lower arms 10 and 11 are pivotally secured to the forward wall of the vehicle body 1 at 10a and 11a, respectively. So-called king pins 12 are provided to pivotally interconnect the forward or free ends of the front upper arms 6 and 7 and the forward or free ends of the front lower arms 10 and 11, respectively, and axles 13a and 14a of the front wheels 13 and 14 are supported by the king pins 12 in a manner capable of being steered.

Likewise, below the rearwardly extending rear upper arms 8 and 9, there are provided rearwardly extending rear lower arms 16 and 17, and the forward or proximal ends of the lower arms 16 and 17 are pivotally secured to the rear wall of the vehicle body 1 at 16a and 17a. Link pins 18 are provided to pivotally interconnect the rear ends of the rear upper arms 8 and 9 and the rear ends of the rear lower arms 16 and 17, respectively, and axles 19a and 20a of the rear wheels 19 and 20 are rotatably supported by the link pins 18. The axles 19a and 20a are connected with a driving shaft of an engine (not shown) mounted on the rear wall of the vehicle body 1.

Figure 3:
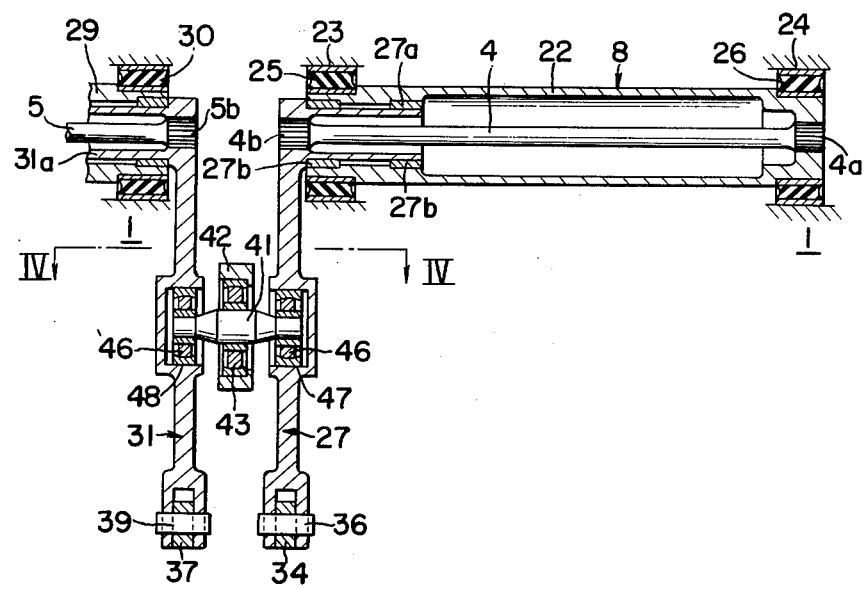
FIG. 3 is a fragmentary vertical section taken along the line III—III in FIG. 2.

As shown in FIG. 3, a cylindrical sheath 22 forms an integral proximal end of the rear upper arm 8 and encloses the left-hand rear torsion bar 4. Spaced apart annular resilient bearings 23 and 24 are secured to the vehicle body 1 and comprises rubber rings 25 and 26 interposed between their inner and outer rings. These bearings 23 and 24 are provided to support the cylindrical sheath 22 in a resilient manner at both ends thereof so that the cylindrical sheath 22 is rotatable around its longitudinal axis. The outer end of the torsion bar 4 is spline-connected at 4a to the outer end of the cylindrical sheath 22. The torsion bar 4 is at its inner end spline-connected at 4b with the upper end of a downwardly extending vertical arm 27, the upper end being integrally formed with a transversely extending hollow stub shaft 27a which is rotatably supported in bearing liners 27b secured to the interior surface of the cylindrical sheath 22.

Another cylindrical sheath 29 of a construction identical to the sheath 22 is provided to enclose the right-hand rear torsion bar 5. The sheath 29 forms an integral proximal end of the rear upper arm 9 and is rotatably supported by the vehicle body 1 via annular resilient bearings, one of which is indicated at 30 in FIG. 3 and is identical to the resilient bearings 23 and 24. The outer end of the torsion bar 5 is spline-connected with the outer end of the cylindrical sheath 29, and the transversely inner end of the torsion bar 5 is spline-connected at 5b with the upper end of another downwardly extending vertical arm 31, the upper end being integrally formed with a hollow stub shaft 31a freely rotatably supported by the interior surface of the cylindrical sheath 29 via bearing linings. The arm 31 has a length equal to that of the arm 27.

The front torsion bars 2 and 3 are also mounted on the vehicle body 1 and connected with the front upper arms 6 and 7 in the same manner as those described above, and the upper ends of downwardly extending vertical arms 32 and 33, which are equal in length, are also spline-connected to the inner ends of the front torsion bars 2 and 3, respectively.

The lower ends of the vertical arms 32 and 27 on the left-hand side of the vehicle body 1 are pivotally connected at 35 and 36 to a horizontally extending link 34, and likewise, the lower ends of the vertical arms 33 and 31 on the right-hand side of the vehicle body 1 are pivotally connected at 38 and 39 to another horizontally extending link 37. The links 34 and 37 are both led through a hollow passage formed in a longitudinal cylindrical part 40 at the lower part of the vehicle body 1 as shown in FIG. 1.

Between the vertical arms 27 and 31 provided at the rear end part of the vehicle body 1, there is provided a generally transversely extending shaft or lever 41 of a comparatively short length, the central part of which is connected through a swivel bearing 43 with the rear end of a connecting link 42 in a manner swingable in any arbitrary direction. The forward end of the connecting link 42 is pivotally attached through a horizontal pin 45 to a stationary bracket 44 (FIG. 4) provided in the proximity of the rear end of the longitudinal cylindrical part 40. The two ends of the short lever 41 are connected to the vertical arms 27 and 31 through swivel bearing 46, respectively. More specifically, the two ends of the shaft 41 are interference-fitted in the inner races of the swivel bearings 46 similar to the swivel bearing 43, and the outer races of the same bearings are slidably received in recesses 47 and 48 provided in opposing relation in the vertical arms 27 and 31, respectively. Thus, swinging displacement of either one of the arms 27 and 31 forwardly or rearwardly around the axis of the associated torsion bar causes displacement of the other arm by an equal distance but in the opposite direction to those of the displacement of the one arm.

Because of the above described organization of the mechanism, when either one of the front and rear upper arms on one side of the vehicle body is swung upward around the axis of the torsion bar associated therewith, the other of the front and rear upper arms is swung downward around the axis of the torsion bar associated therewith, and vice versa. The amounts of vertical displacements of the free ends of the front and rear upper arms, and hence the amounts of vertical displacements of the front and rear wheel axles should be equal to or substantially equal to each other. When loads on the front and the rear wheels are different from each other, the product of the length of the front upper arm and the front wheel load on each side of the vehicle body is made at least substantially equal to the product of the length of the rear upper arm and the rear wheel load on the same side. Also the lengths of the vertical arms 32 and 27, or 33 and 31 on each side of the vehicle body are so selected that the vertical displacements of the front and rear wheels caused thereby are at a least substantially equal to each other.

For the above described reason, the ratio of the length of the front upper arm on each side to the length of the associated vertical arm is equal to the ratio of the rear upper arm on each side to the length of the associated vertical arm. Accordingly, when the vehicle is, for example, of a rear engine type wherein the load on the rear wheel is greater than that on the front wheel, the force exerted on the rear vertical arm 27 or 31 and the horizontal link 34 or 37 rearwardly is greater than the force exerted on the front vertical arm 32 or 33 and pulling the same horizontal link 34 or 37 forwardly.

The torques or moments of forces created by the wheel loads in the proximal ends of the upper arms 6 and 8, or in the torsion bars 2 and 4 on the left-hand side of the vehicle, are transmitted to the arm 27 and converted into a moment of force in the vertical arm 27, and likewise the torques or moments of forces created by the wheel loads in the proximal ends of the upper arms 7 and 9, or in the torsion bars 3 and 5 on the right-hand side of the vehicle are transmitted to the arm 31 and converted into a moment of forces in the vertical arm 31. When the moments of forces acting on the vertical arms 27 and 31 are equal to each other, the short shaft 41, the central part thereof being supported from the vehicle body, is retained in the normal position indicated by solid lines in FIG. 4, so that the vehicle body is maintained horizontally.

Figure 4:
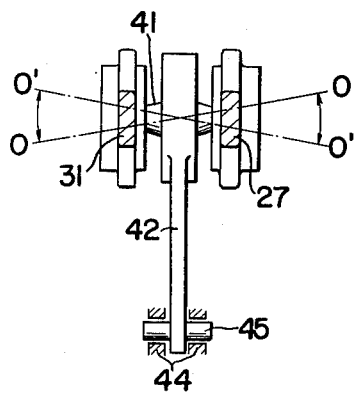
FIG. 4 is a sectional view taken along the line IV—IV in FIG. 3.
Figure 5:
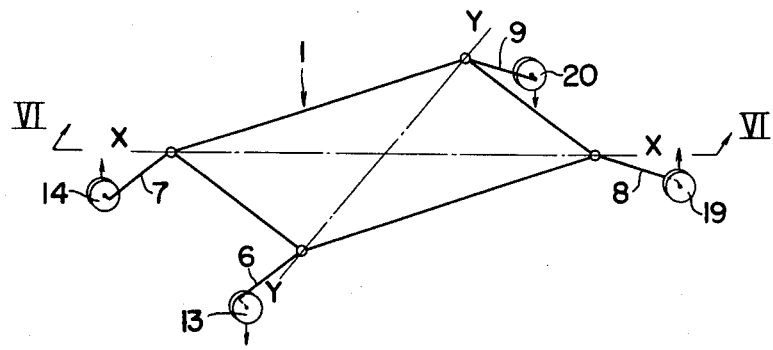
FIG. 5 is a diagrammatic view explanatory of the operation of the suspension mechanism according to this invention.

When a vehicle wheel, for instance, the right-hand front wheel 14 is displaced upward as shown in FIG. 5, the right-hand rear wheel 20 is displaced downward for the reason as set out hereinbefore, and the resultant swinging movement of the vertical arm 31 around the axis of the torsion bar 5 causes angular displacement of the lever 41 to the position indicated by line 0—0 in FIG. 4.

The angular displacement of the lever 41 in turn causes the vertical arm 27 on the left-hand side to swing in the opposite direction by an equal angular amount, thereby elevating the rear wheel 19 on the left-hand side by a distance equal to the amount of the downward displacement of the right-hand side vehicle wheel 20. Simultaneously therewith, the left-hand side front wheel 13 is lowered by a distance equal to the amount of the upward displacement of the right-hand side front wheel 14.

Figure 6:
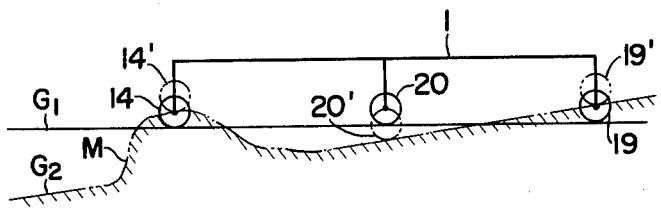
FIG. 6 is a diagrammatic view taken along the line VI—VI in FIG. 5 and showing a certain state of the suspension mechanism.

If the vehicle wheels 13, 14, 19 and 20, which have been rolling on a flat ground $G_1$, roll onto a ground $G_2$ having a hump M as shown in chain line in FIG. 6, and the wheel 14 rides over the hump M, these wheels are displaced to positions 13', 14', 19' and 20'. More specifically, the wheel 13 moves downward, the wheel 20 downward and the wheel 19 upward, so that all the wheels are maintained in contact with the rough surface of the ground $G_2$.

Figure 7:
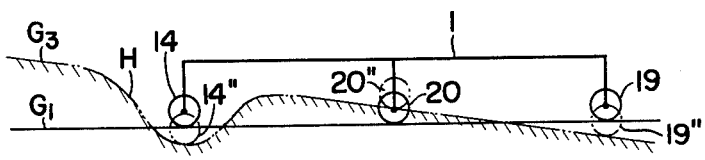
FIG. 7 is a diagrammatic view similar to FIG. 6, but showing another state of the suspension mechanism.

Conversely, when the vehicle wheels rolls onto a ground $G_3$ having a recess H as shown in FIG. 7 and the wheel 14 rides into the recess H, the wheels 14 and 19 which are in diagonally opposing relationship are now lowered as indicated at 14'' and 19'', while the other pair of the diagonally opposing wheels 13 and 20 are raised as indicated at 13'' and 20'', whereby all the wheels are maintained in contact with the rough surface of the ground $G_3$.

In either of the above described cases, it is easily understood that rolling and pitching of the vehicle are not created in either one of the vertical planes including the diagonals X and Y in FIG. 5. It is apparent that this is also true when any of the wheels other than the wheel 14 rides over a hump or into a recess.

In the case the front or rear wheels ride over a hump or into a recess, the mechanism does not make any movement except that the front or rear arms 6, 7 or 8, 9 are upwardly or downwardly swung due to torsional displacement of the front or rear torsion bars 2, 3 or 4, 5, and the shock absorption is made by the torsion bars.

According to this invention, the mechanism does not affect the provision of doorways of vehicles because the torsion bars and their associated arms are installed at the front and rear parts of the vehicle body and the links connecting the front and rear torsion bar mechanism are extended under the bottom of the vehicle body. Moreover, because the spaces directly forward and backward of the front and rear torsion bars are not occupied by the mechanism, it does not restrict the spaces for the provision of the trunk and the engine compartment of the vehicle body.

We claim:

1. A suspension mechanism for a four-wheeled vehicle body, comprising a pair of horizontal front torsion bars rotatably supported by a front part of the vehcile body and aligned in a direction transverse to the front-to-rear direction of the vehicle body, a pair of front arms extending forwardly of the vehicle body and secured to the transversely outer ends of the front torsion bars, respectively, said front arms carrying front vehicle wheels, respectively, a pair of front vertical arms having their upper ends secured to the transversely inner ends of the front torsion bars, respectively, a pair of horizontal rear torsion bars rotatably supported by a rear part of the vehicle body and aligned in a direction transverse to the front-to-rear direction of the vehicle body, a pair of rear arms extending rearwardly of the vehicle body and secured to the transversely outer ends of the rear torsion bars, respectively, said rear arms carrying rear vehicle wheels, respectively, a pair of rear vertical arms having their upper ends secured to the transversely inner ends of the rear torsion bars, respectively, a pair of links extending in said front-to-rear direction and having their front ends pivotally connected to the lower ends of said front vertical arms and their rear ends pivotally connected to the lower ends of said rear vertical arms, respectively, and a transversely extending lever pivotally supported at its middle part by the vehicle body and pivotally connected at its both ends to intermediate parts of one of said pairs of the front and rear vertical arms.

2. The suspension mechanism as claimed in claim 1, wherein said links extend through a hollow passage formed in the lower part of the vehicle body.

3. The suspension mechanism as claimed in claim 1, wherein said lever is pivotally connected to said vertical arms via swivel bearings slidably received in recesses formed in the vertical arms.

4. The suspension mechanism as claimed in claim 1, wherein said lever is pivotally supported by the vehicle body through a link extending in the front-to-rear direction of the vehicle body and pivotally connected to the vehicle body at one end thereof and to the lever at the other end thereof.

5. The suspension mechanism as claimed in claim 1, further including a sheath forming the proximal end of each of the front and rear arms and rotatably supported by the vehicle body, said sheath enclosing therein the torsion bar associated with the proximal end.

6. The suspension mechanism as claimed in claim 5, further including a stub shaft rotatably received in said sheath and forming an integral upper part of the vertical arm associated with the torsion bar.

* * * * *